(12) United States Patent
Palally

(10) Patent No.: US 11,863,241 B2
(45) Date of Patent: Jan. 2, 2024

(54) OVER-THE-AIR TESTING FOR 5G NR BEAMFORMING

(71) Applicant: Parallel Wireless, Inc., Nashua, NH (US)

(72) Inventor: Hemanth Palally, Bangalore (IN)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 17/237,042

(22) Filed: Apr. 21, 2021

(65) Prior Publication Data

US 2021/0328691 A1    Oct. 21, 2021

Related U.S. Application Data

(60) Provisional application No. 63/013,460, filed on Apr. 21, 2020.

(51) Int. Cl.
| | | |
|---|---|---|
| *H04B 17/18* | (2015.01) | |
| *H04B 7/0452* | (2017.01) | |
| *H04B 7/06* | (2006.01) | |

(52) U.S. Cl.
CPC .......... *H04B 17/18* (2015.01); *H04B 7/0452* (2013.01); *H04B 7/0617* (2013.01); *H04B 7/0634* (2013.01)

(58) Field of Classification Search
CPC .... H04B 17/18; H04B 7/0452; H04B 7/0617; H04B 7/0634; H04B 7/0413
USPC ............................... 375/224, 267; 455/67.11
See application file for complete search history.

(56) References Cited

U.S. PATENT DOCUMENTS

| | | | | |
|---|---|---|---|---|
| 10,182,355 | B1* | 1/2019 | Yan | H04B 17/3912 |
| 2014/0153482 | A1* | 6/2014 | Schmidt | H04W 72/08 |
| | | | | 370/328 |
| 2016/0212641 | A1* | 7/2016 | Kong | H04B 17/0087 |
| 2017/0019154 | A1* | 1/2017 | Reed | H04B 7/0413 |

(Continued)

OTHER PUBLICATIONS

Fogarty: "5G Drives New Test Approaches", https://semiengineeringcom/testing-5g/, Jun. 11, 2019.

(Continued)

*Primary Examiner* — Don N Vo
(74) *Attorney, Agent, or Firm* — Michael Y. Saji; David W. Rouille

(57) ABSTRACT

A method and system for performing Over-The-Air (OTA) testing for 5G New Radio (NR) beamforming is presented. In one embodiment the method includes transmitting, by only the User Equipments (UEs) U and Sx, the Orthogonal Frequency Division Multiplexing (OFDM) symbols containing UL Demodulation Reference Signal (DMRS) that are orthogonal to each other during Uplink (UL) subframes; performing, by a gNB, channel estimation in the same UL subframe, precoding matrix computation, and antenna elements weighting coefficient computations; transmitting, by the gNB in a subsequent Downlink (DL) subframe, known data streams to UEs U and $S_x$ using the massive MU-MIMO beamforming coefficients; collecting by the host PC, the IQ samples from the UE U and all the victim UEs $V_x$ in the DL subframe; and evaluating a performance of the beam that was meant for UE U.

13 Claims, 11 Drawing Sheets

(56) References Cited

U.S. PATENT DOCUMENTS

2017/0195357 A1* 7/2017 Sundhar .............. H04W 24/06
2019/0342800 A1* 11/2019 Sirotkin .............. H04B 17/318
2020/0186261 A1* 6/2020 Devarasetty ......... H04B 7/0617
2021/0250071 A1* 8/2021 Hammond ............ H04B 17/30

OTHER PUBLICATIONS

"5G New Radio Solutions for Chipset and Device Designers", Keysight Technologies, May 9, 2019.
Hurtarte et al.: "Understanding 5G Millimeter Wave Beamforming Test", https://www.rfglobalnet.com/doc/understanding-g-millimeter-wave-beamforming-test-0001, Apr. 15, 2019.

* cited by examiner

OVER-THE-AIR TESTING FOR 5G NR BEAMFORMING

CROSS-REFERENCE TO RELATED APPLICATIONS

This application claims priority under 35 U.S.C. § 119(e) to U.S. Provisional Pat. App. No. 63/013,460, filed Apr. 21, 2020, titled "Over-the-Air Testing for 5G NR Beamforming" which is hereby incorporated by reference in its entirety for all purposes. The present application hereby incorporates by reference U.S. Pat. App. Pub. Nos. US20110044285, US20140241316; WO Pat. App. Pub. No. WO2013145592A1; EP Pat. App. Pub. No. EP2773151A1; U.S. Pat. No. 8,879,416, "Heterogeneous Mesh Network and Multi-RAT Node Used Therein," filed May 8, 2013; U.S. Pat. No. 8,867,418, "Methods of Incorporating an Ad Hoc Cellular Network Into a Fixed Cellular Network," filed Feb. 18, 2014; U.S. patent application Ser. No. 14/777,246, "Methods of Enabling Base Station Functionality in a User Equipment," filed Sep. 15, 2016; U.S. patent application Ser. No. 14/289,821, "Method of Connecting Security Gateway to Mesh Network," filed May 29, 2014; U.S. patent application Ser. No. 14/642,544, "Federated X2 Gateway," filed Mar. 9, 2015; U.S. patent application Ser. No. 14/711,293, "Multi-Egress Backhaul," filed May 13, 2015; U.S. Pat. App. No. 62/375,341, "S2 Proxy for Multi-Architecture Virtualization," filed Aug. 15, 2016; U.S. patent application Ser. No. 15/132,229, "MaxMesh: Mesh Backhaul Routing," filed Apr. 18, 2016, each in its entirety for all purposes. This application also hereby incorporates by reference in their entirety each of the following U.S. Pat. applications or Pat. App. Publications: US20150098387A1; US20170055186A1; US20170273134A1; US20170272330A1; and Ser. No. 15/713,584. This application also hereby incorporates by reference in their entirety U.S. patent application Ser. No. 16/424,479, "5G Interoperability Architecture," filed May 28, 2019; and U.S. Provisional Pat. Application No. 62/804,209, "5G Native Architecture," filed Feb. 11, 2019.

BACKGROUND

Massive MIMO Beamforming is the key technology adopted in 5G-NR that enables significant increase in throughput and coverage. A large number of antenna elements are used relative to the number of users served. This provides high spatial degrees of freedom that can be exploited to generate highly focused radiation towards the user equipment. This also allows the base stations to spatially multiplex data streams to multiple devices (MU-MIMO) using the same time-frequency resource. However, testing the beamforming performance of the base stations opens up new challenges due to large number of antennas and highly integrated and active nature of antenna elements. It is impractical to perform such tests using traditional cabled setups and requires over-the-air test setups. Conventionally, when the antennas are few and are discrete in nature, we can satisfactorily design and verify the baseband (digital) processing and reproduce the same performance in the full system (with antennas). However this cannot be done with large antenna arrays.

SUMMARY

Here we provide a cost-effective system and method for evaluating the beamforming performance of 5G-NR base station equipped with large antenna arrays.

An OTA testing methodology is disclosed that helps to verify the design and also evaluate the performance of the beamforming capabilities of gNB. The proposed test setup will reduce the iterations between baseband design changes and testing as it considers the antenna arrays. It also helps to get insights about the power consumption and the amount of imperfections added as the number of antennas are varied, so that important design trade-offs can be made. The setup is made by isolating only the components contributing to the beamforming.

In one embodiment a system, method, CRM

DETAILED DESCRIPTION

Figure 1:
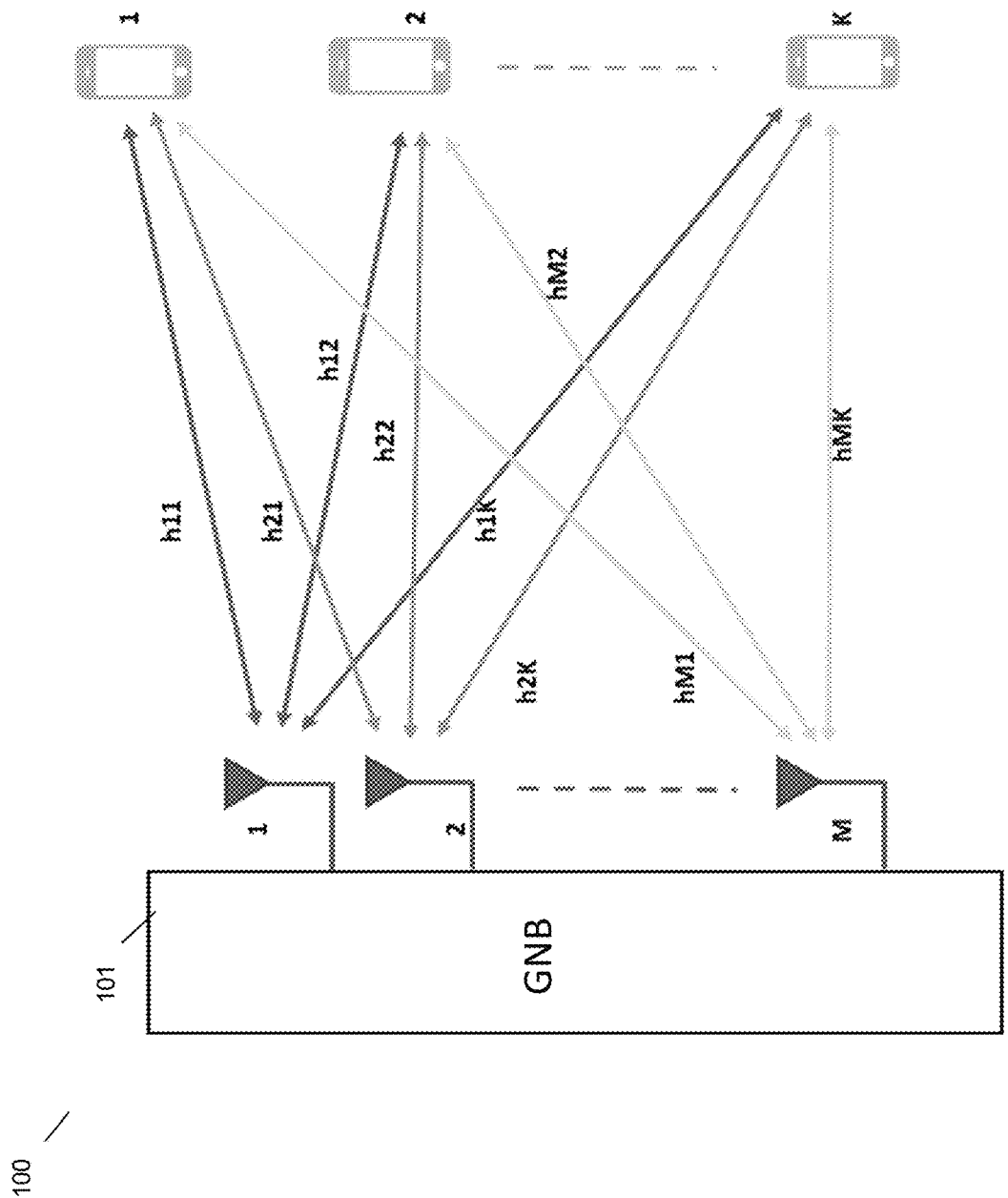
FIG. 1 is a diagram showing a gNB with M antenna elements serving K users, in accordance with some embodiments.

Massive MIMO is an extended version of MU-MIMO where the number of base station antennas and number of users are large. However, the number of base station antennas are excessive large compared to number of users served. Having large number of antennas at base station provides high spatial degrees of freedom that can be exploited to generate highly focused radiation towards the user equipment. This also allows the base stations to spatially multiplex data streams to multiple devices (MU-MIMO) using the same time-frequency resource.

The prior art focus on the UE as the DUT (device under test), and they are focus only on the antenna aspects. In our case DUT is the combination of the following components of gNB. Baseband processing (channel estimation, precoding, Angle of arrival calculation), +ADC, amplifiers, Antenna Array elements.

Prior arts do not consider the channel learning capabilities of the DUT. The quality of beamforming heavily depends on how well gNB is deriving the channel information H from the uplink pilot or reference signal, and based on H, it performs the beamforming operation in the downlink. So we are covering the complete UL and DL loop. The prior are very generic and do not cater to the 5G-NR specifications.

In actual systems, various systems perform differently regarding how well does the gNB read the channel, depends on: channel estimation algorithm, and how aligned the phase shifter is. Each antenna element has its own phase shifter and it is aligned. Since we send a signal out over the air, the gNB is enabled to learn and figure out how to pass the beam, for beamforming purposes. This enables us to test the gNB's channel learning performance, including actual performance and not simulations.

In addition, automation capabilities are used to ease the design and verification process. For example, every time an algorithm or any antenna parameter is changed. A run is triggered which gives us the OTA performance report.

Previously we estimated only the characteristics of the channel. However, when the number of antennas increases, you have to learn the antennas also. So, in the uplink, using the UE emulators, we are feeding the reference signals, then estimating the channel, then using the estimated channel we are doing the precoding in the downlink.

The prior art tries to do testing of beamforming with RF chambers, e.g., choose an angle and direct some beam toward it and see how much power is received and at what angle. However, this is deficient because this doesn't determine what the gNB is learning about the channel, and how well it is reading from the signal. By sending a signal over the air, the gNB can learn and figure out how to pass the beam.

For massive MIMO, it is important to include the antenna arrays in the design stages of the beamforming module. This will give us insights about how certain aspects of antenna array design can impact the overall beamforming capabilities.

The invention differs from the prior art, in following respects. First, the prior art focus on the UE as the DUT (device under test), and they are focus only on the antenna aspects. In our case DUT is the combination of the following components of gNB: Baseband processing (channel estimation, precoding, Angle of arrival calculation); ADC, amplifiers, Antenna Array elements. Also, the prior art does not consider the channel learning capabilities of the DUT. The quality of beamforming heavily depends on how well gNB is deriving the channel information H from the uplink pilot or reference signal. And based on H, it performs the beamforming operation in the downlink. So we are covering the complete UL and DL loop. Also, the prior art is very generic and do not cater to the 5G-NR specifications.

In some embodiments, automation capabilities are used to ease the design and verification process. For example, every time we change an algorithm, or any antenna parameter, we can trigger the run which gives us the OTA performance report.

FIG. 1 shows a system 100 including a gNB 101 with M antenna elements serving K users. $h_{ij}$ represents the channel experienced between $i^{th}$ antenna in gNB and $j^{th}$ user.

Figure 2:
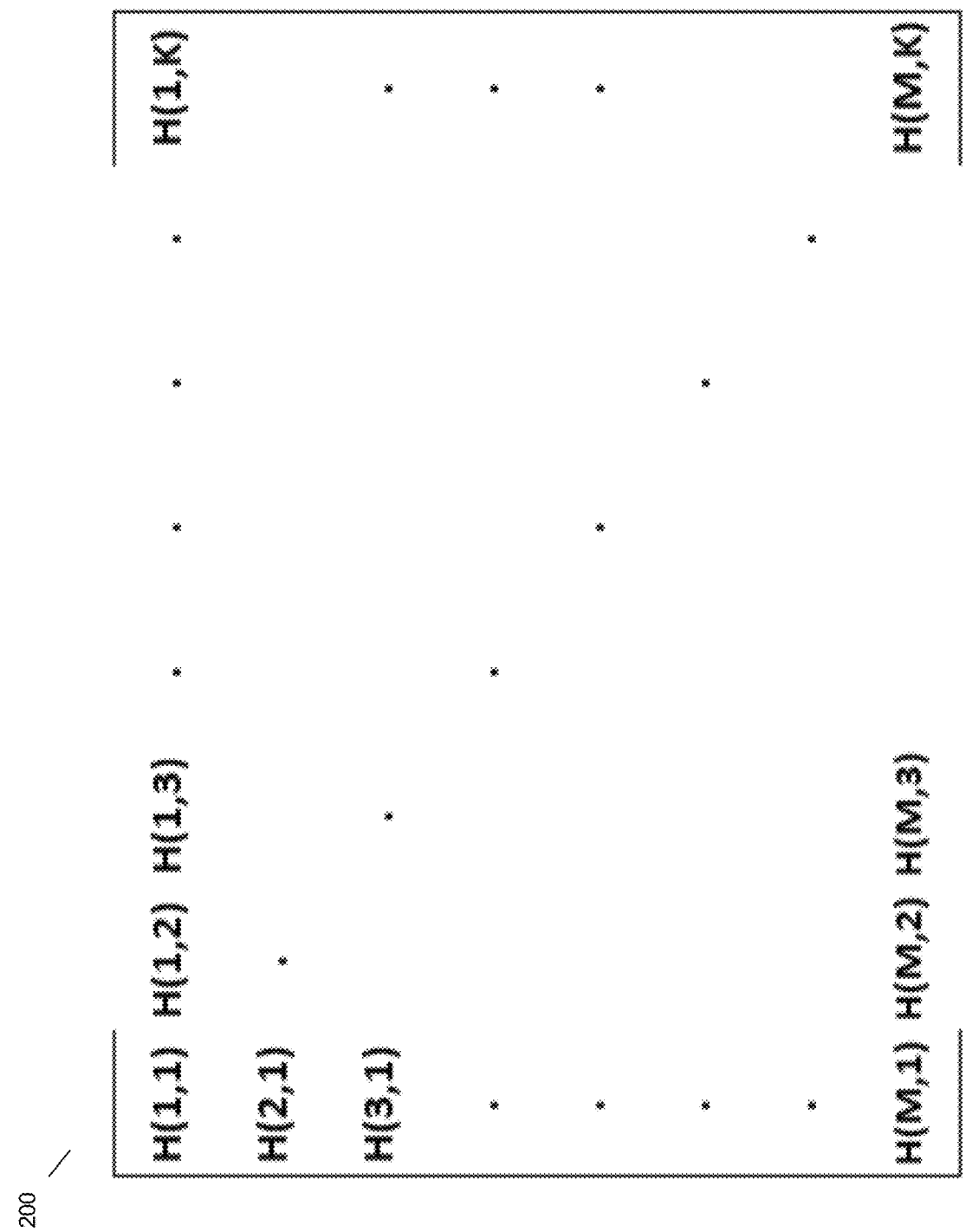
FIG. 2 is a diagram showing channel state information to be learned by the gNB in each subcarrier, in accordance with some embodiments.

For a Massive MIMO system using OFDM modulation the channel is modeled with a matrix of dimension N×K as show in FIG. 2. Each element in the matrix represents the channel frequency response between the gNB antenna and a user for a given subcarrier FIG. 1 shows the channel state information 200 to be learned by the gNB in each subcarrier Precoding:

From FIG. 1 it is clear that each user receives the unwanted signal (data meant for other users) causing interference which make it impossible for the user to detect the data directed towards it.

Precoding is a technique employed at the gNB transmitter so that interference experienced by each user is either minimum or zero and it can properly detect the intended signal.

Precoding is performed by pre multiplying the transmit vector of size M×1 with a precoding matrix of dimension K×M before feeding the transmit signal to the antennas In order to compute the precoder matrix the gNB should have the knowledge of channel matrix H, which it estimates using the pilots sent in the uplink by each user.

Time Division Duplexing (TDD) is the preferred mode of operation for massive MIMO as it allows to use the reciprocity of the channel in both Uplink and downlink and there by eliminates the pilot overhead in downlink.

Massive MU-MIMO Beamforming capabilities plays a crucial role for the overall performance of the gNB. However, testing of gNB beamforming mechanism opens new challenges.

Traditional approach of cable-based testing methodologies is not applicable for massive MIMO for the reasons mentioned below and Over-the-Air (OTA) testing methodologies needs to be applied Measurement of end-to-end performance of the beamforming mechanism is not possible by merely taking the measurements at individual antennas as the antenna array elements used for massive MIMO are active in nature New antenna array designs are highly integrated with other active components like amplifiers and probing the antenna signals is not possible Also, when large antenna arrays are involved, it is not effective to design or characterize the baseband separately without considering the antenna array characteristics. The baseband that is designed based on the channel simulations, is unlikely to provide the same performance when integrated with the arrays. So, it is important to involve the antenna arrays during the initial stages of baseband designs An OTA testing methodology is disclosed that helps to verify the design and also evaluate the performance of the beamforming capabilities of gNB. The proposed test setup will reduce the iterations between baseband design changes and testing as it considers the antenna arrays. It also helps to get insights about the power consumption and the amount of imperfections added as the number of antennas are varied, so that important design trade-offs can be made. The setup is made by isolating only the components contributing to the beamforming.

Figure 3A:
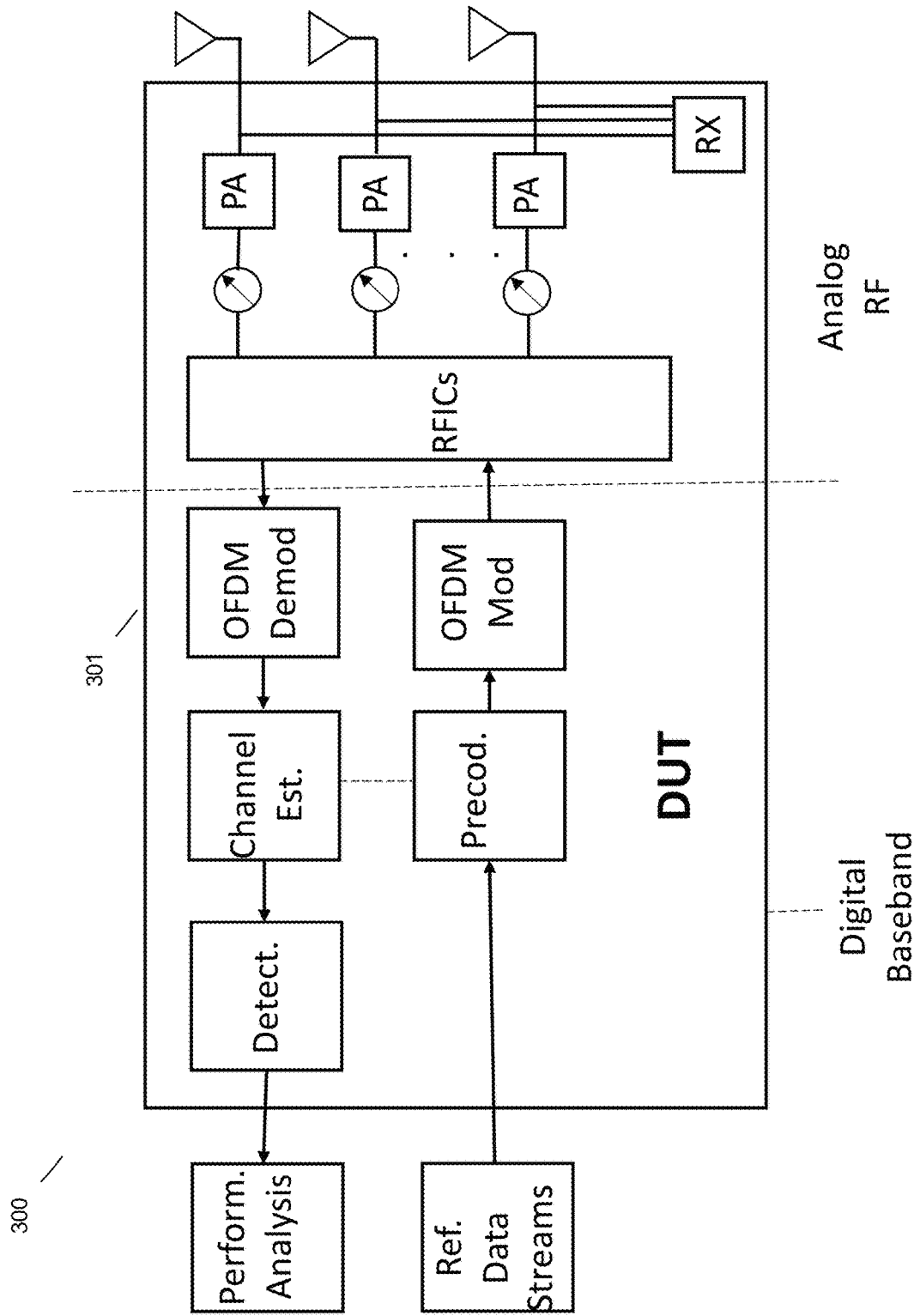
FIG. 3A is a diagram showing a device under test, in accordance with some embodiments.

FIG. 3A is a diagram of a portion of a test setup 300 including a DUT 301. The DUT 301 includes a digital baseband section and an analog RF section.

Figure 3B:
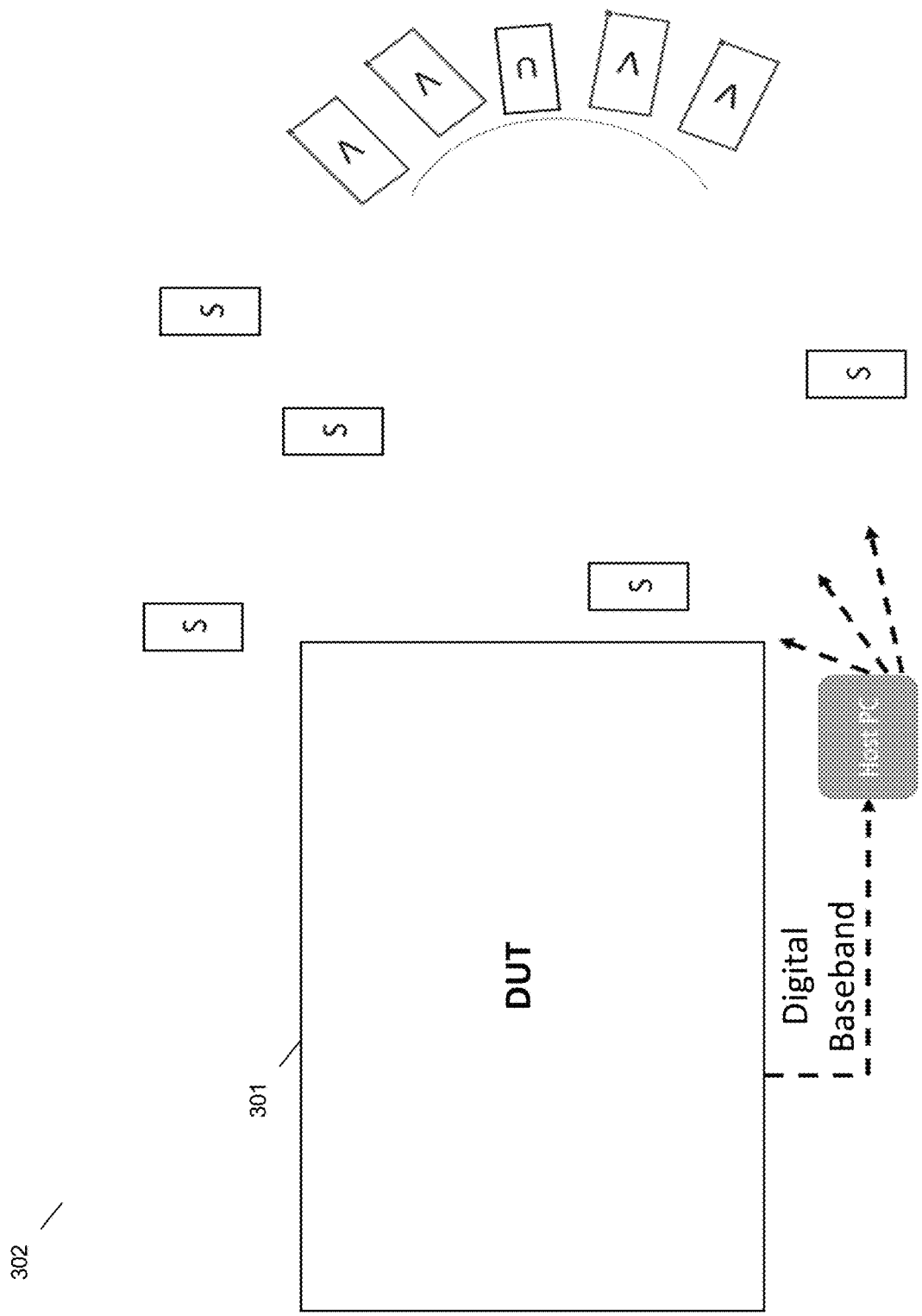
FIG. 3B is a diagram showing the device under test in an OTA setup, in accordance with some embodiments.

FIG. 3B is a diagram of an OTA test Setup 302. The OTA setup includes a device under test (DUT) 301. Also shown are UE U, UEs S and UEs V. UE U is used for assessing the performance of the beam directed towards it, UEs V are victim UEs and UEs S increase the dimension of a matrix H for a given test.

FIG. 2 is a diagram of a UE simulator board 400.

In some embodiments, baseband processing is performed in a DSP or FPGA and is coupled to the antenna arrays. A small circuit board may be used that integrates these two components, forming a DUT. In some embodiments a UE simulator is not part of the DUT. Since this doesn't need to be in an RF chamber, this results in a more real-world result. Various papers describe different types of scatterers and these scatterers can be added to the system to test different scenarios. An antenna array element used herein may each include a phase shifter, low noise amplifier (LNA), etc. We can additionally measure: how much power is drawn; what is minimum number of elements for a certain level of performance.

The device to be tested includes all the components contributing for beamforming. The Antenna array system contains N active antenna array elements along with calibration mechanism to maintain UL DL reciprocity. The Module 'Precoder' includes both digital precoding and direct weighting of the antenna elements to form a directed beam.

Figure 5:
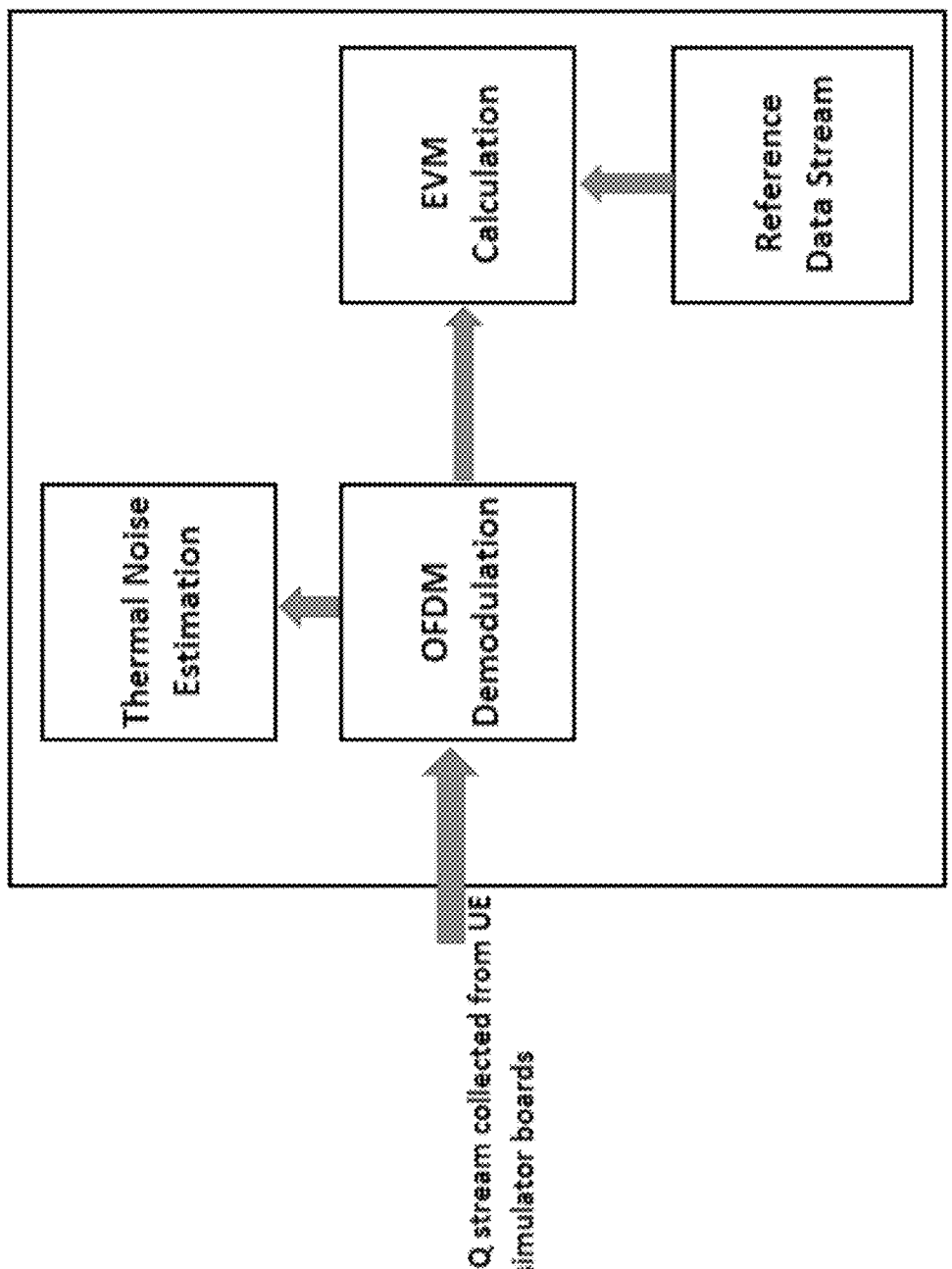
FIG. 5 is diagram showing beamforming performance evaluation, in accordance with some embodiments.

The host PC does the scheduling of Uplink transmissions from each of the UE boards and then collects the IQ samples from the UE boards to do performance analysis as shown in FIG. 5.

The frame structure mentioned in 3GPP 38.211 is followed. Any of the TDD UL-DL configurations (refer FIG. 6) can be used.

Figure 4:
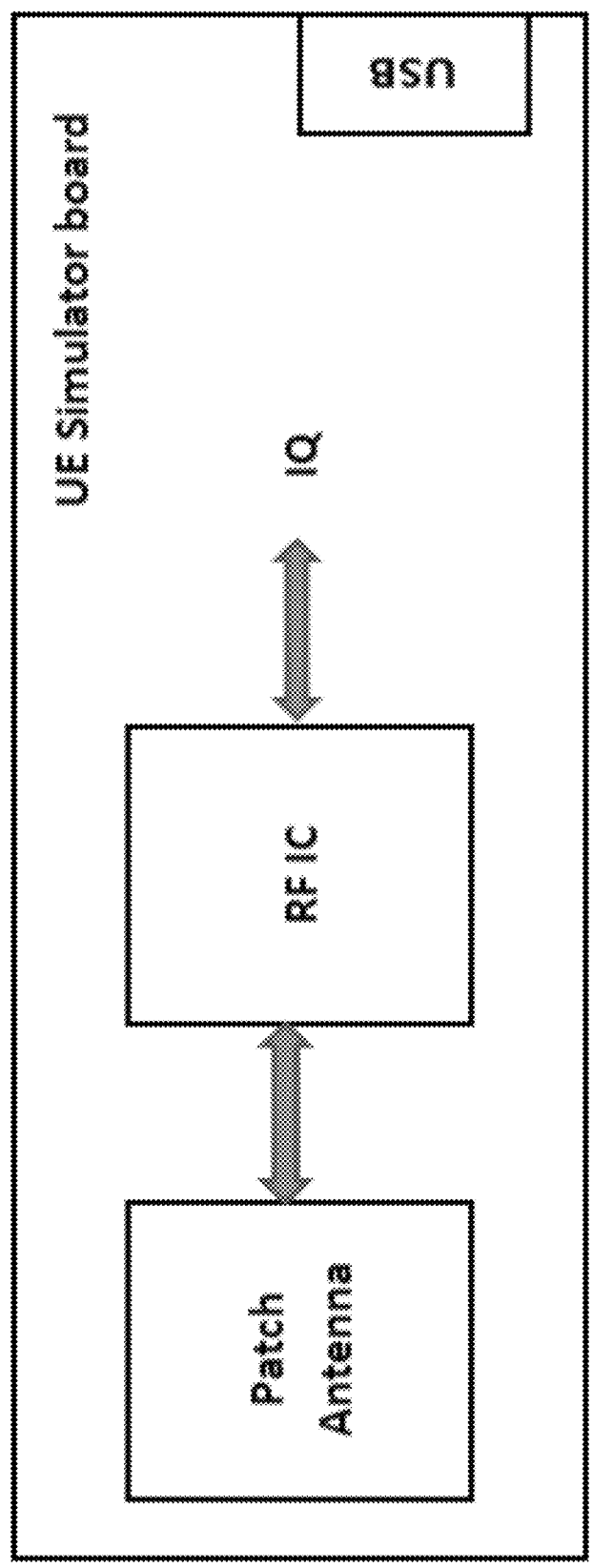
FIG. 4 is a diagram showing a UE simulator board, in accordance with some embodiments.

The UE simulator boards as shown in FIG. 4 are used to simulate the UE functionality required to test the beamforming capability of gNB. It is a simple and cost-effective module which can be constructed using off-the-shelf components. An optional power amplifier can be used for testing at long distances from gNB.

UE U is used for assessing the performance of the beam directed towards it.

UEs $V_x$ are the victim UEs that are used to evaluate the deviation of the intended beam from U. These UEs are placed at horizontal angles of $\theta_x$ and vertical angles $\varphi_x$ relative to U.

UEs $S_x$ only serve to increase the dimension of the matrix H for a given test. Larger dimensions of H lead to more challenges in Beamforming implementation.

gNB and all the UE boards are synchronized using a master clock.

The steps involved in the testing are as follows:
a. During the UL subframes, only the UEs U and $S_x$ transmit the OFDM symbols containing UL DMRS (Demodulation Reference Signal) that are orthogonal to each other as mentioned in 38. 211.UEs $V_x$ are victim UEs and they do not transmit in uplink
b. In the same UL subframe, gNB performs the channel estimation, precoding matrix computation, antenna elements weighting coefficient computation
c. In the subsequent DL subframe, gNB transmits known data streams to UEs U and $S_x$ using massive MU-MIMO beamforming coefficients computed in 2
d. In the same subframe as 3, the host PC collects the IQ samples from the UE U and all the victim UEs $V_x$ and evaluates the performance (refer FIG. 5) of the beam that was meant for UE U.

Performance Metric: EVM (error vector magnitude) of the demodulated QAM symbols from the UEs U and $V_x$ are used to evaluate the 3-D beamforming performance. The thermal noise variance $\sigma^2$ from U and $V_x$ are used to calibrate the values of EVM.

Similar performance analysis can be done for UL data detection

FIG. 3 is a diagram of a circuit 500 for performing Beamforming Performance evaluation.

The Host PC does the scheduling of Uplink transmissions from each of the UE boards and then collects the IQ samples from the UE boards to do performance analysis as shown in FIG. 5.

Figure 6A:
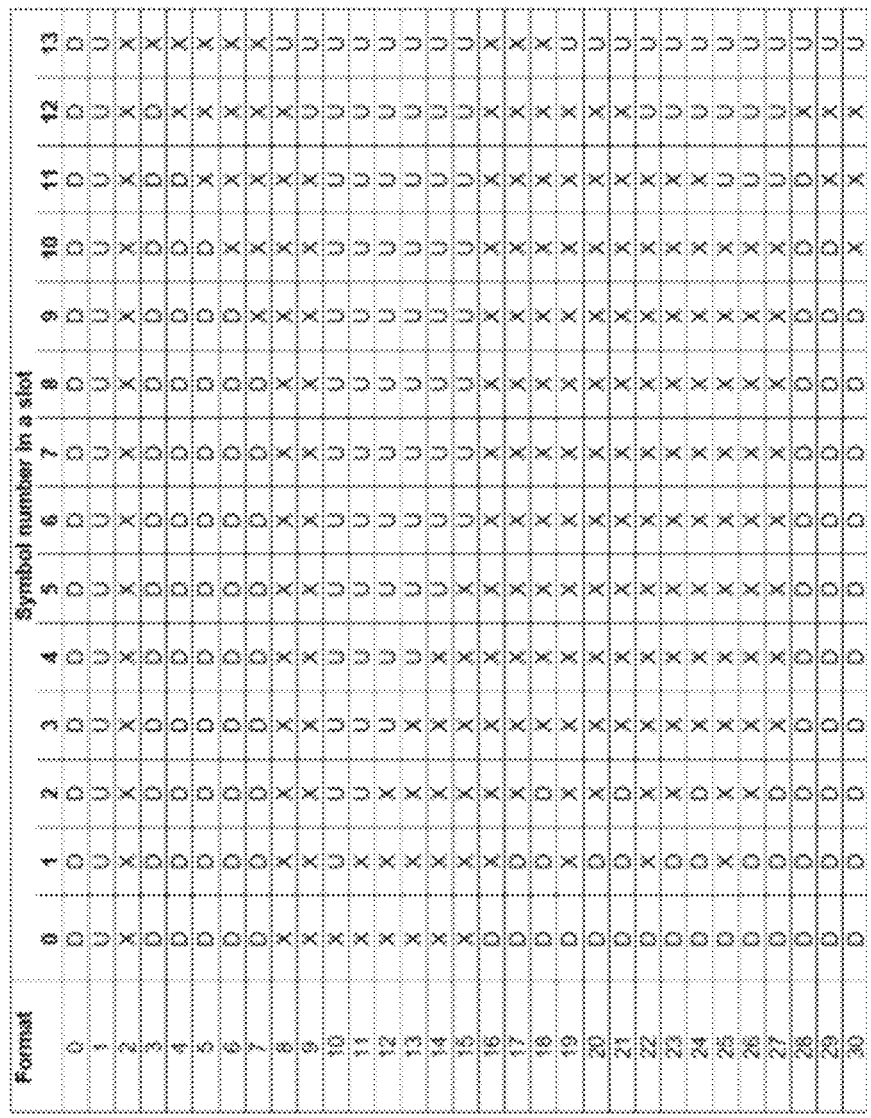
FIGS. 6A and 6B is a chart showing TDD UL DL configuration, in accordance with some embodiments.
Figure 6B:
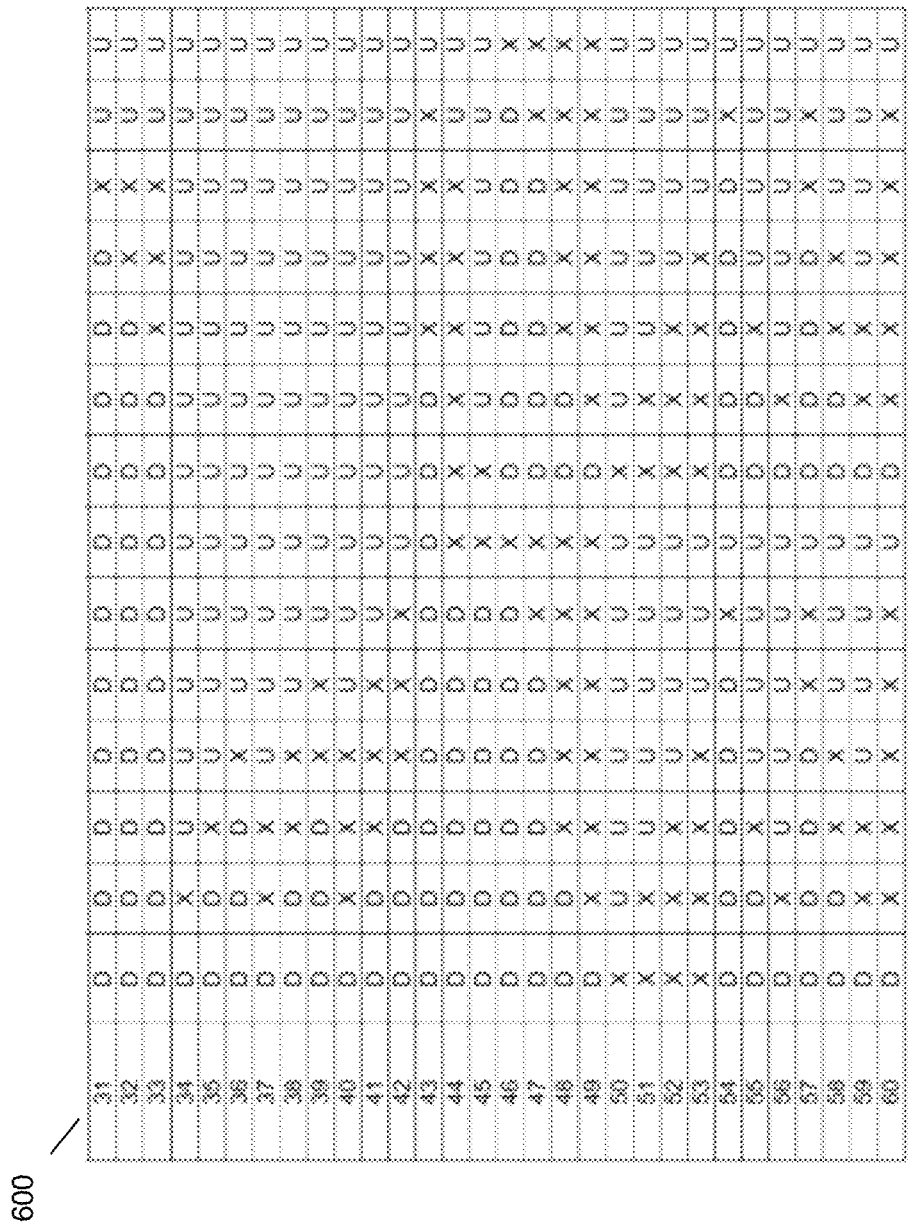

FIGS. 6A and 6B are a diagram of a single TDD UL DL Configuration (U: uplink, D: Downlink, X: flexible).

Figure 7:
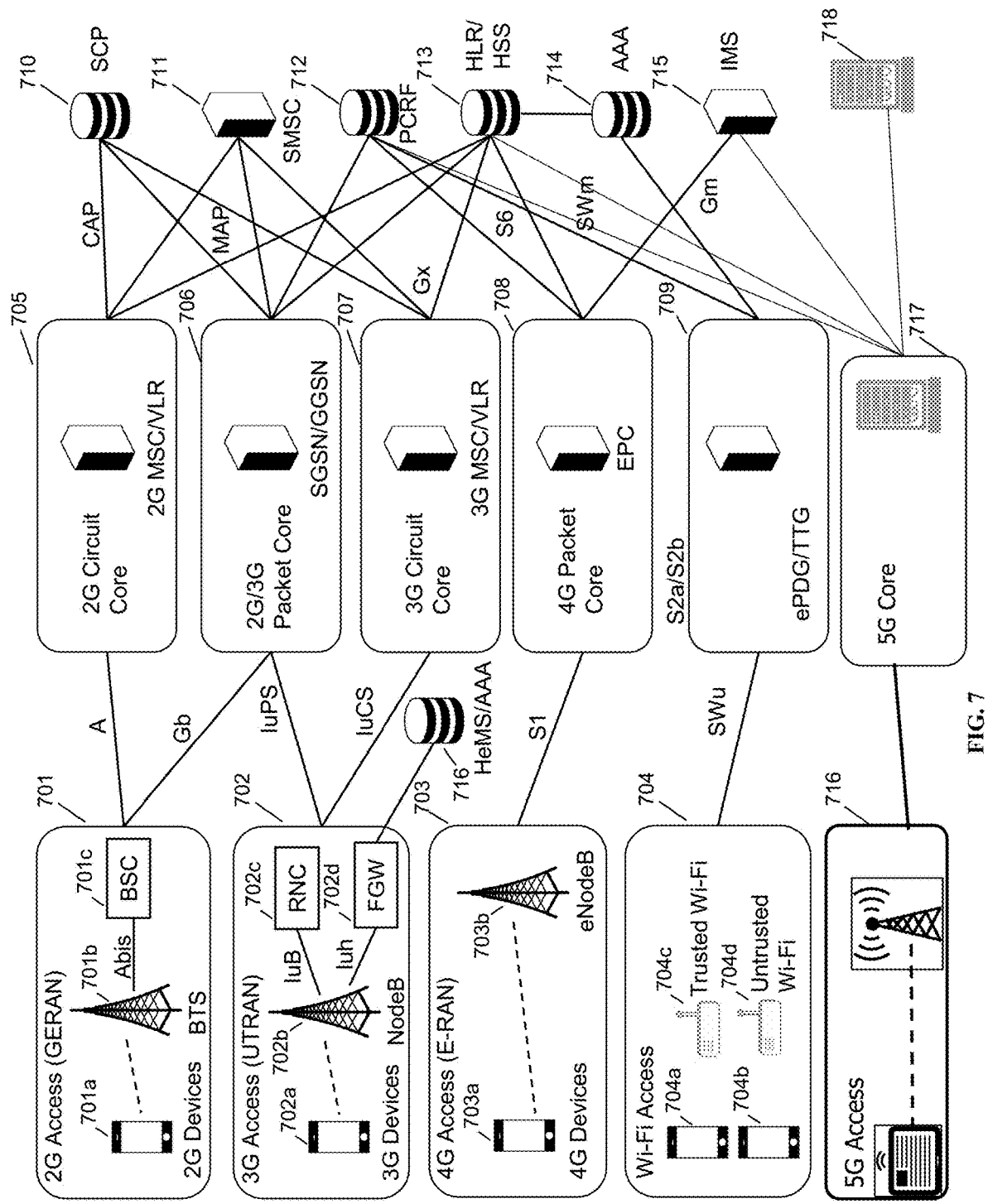
FIG. 7 is a schematic network architecture diagram for various radio access technology core networks.

FIG. 7 is a schematic network architecture diagram for 3G and other-G prior art networks. The diagram shows a plurality of "Gs," including 2G, 3G, 4G, 5G and Wi-Fi. 2G is represented by GERAN 801, which includes a 2G device 701a, BTS 701b, and BSC 701c. 3G is represented by UTRAN 702, which includes a 3G UE 702a, nodeB 702b, RNC 702c, and femto gateway (FGW, which in 3GPP namespace is also known as a Home nodeB Gateway or HNBGW) 702d. 4G is represented by EUTRAN or E-RAN 703, which includes an LTE UE 703a and LTE eNodeB 703b. Wi-Fi is represented by Wi-Fi access network 704, which includes a trusted Wi-Fi access point 704c and an untrusted Wi-Fi access point 704d. The Wi-Fi devices 704a and 704b may access either AP 704c or 704d. In the current network architecture, each "G" has a core network. 2G circuit core network 705 includes a 2G MSC/VLR; 2G/3G packet core network 706 includes an SGSN/GGSN (for EDGE or UMTS packet traffic); 3G circuit core 707 includes a 3G MSC/VLR; 4G circuit core 708 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 730, the SMSC 731, PCRF 732, HLR/HSS 733, Authentication, Authorization, and Accounting server (AAA) 734, and IP Multimedia Subsystem (IMS) 735. An HeMS/AAA 736 is present in some cases for use by the 3G UTRAN. The diagram is used to indicate schematically the basic functions of each network as known to one of skill in the art, and is not intended to be exhaustive. For example, 5G core 717 is shown using a single interface to 5G access 716, although in some cases 5G access can be supported using dual connectivity or via a non-standalone deployment architecture.

Noteworthy is that the RANs 701, 702, 703, 704 and 736 rely on specialized core networks 705, 706, 707, 708, 709, 737 but share essential management databases 730, 731, 732, 733, 734, 735, 738. More specifically, for the 2G GERAN, a BSC 701c is required for Abis compatibility with BTS 701b, while for the 3G UTRAN, an RNC 702c is required for Iub compatibility and an FGW 702d is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

Figure 8:
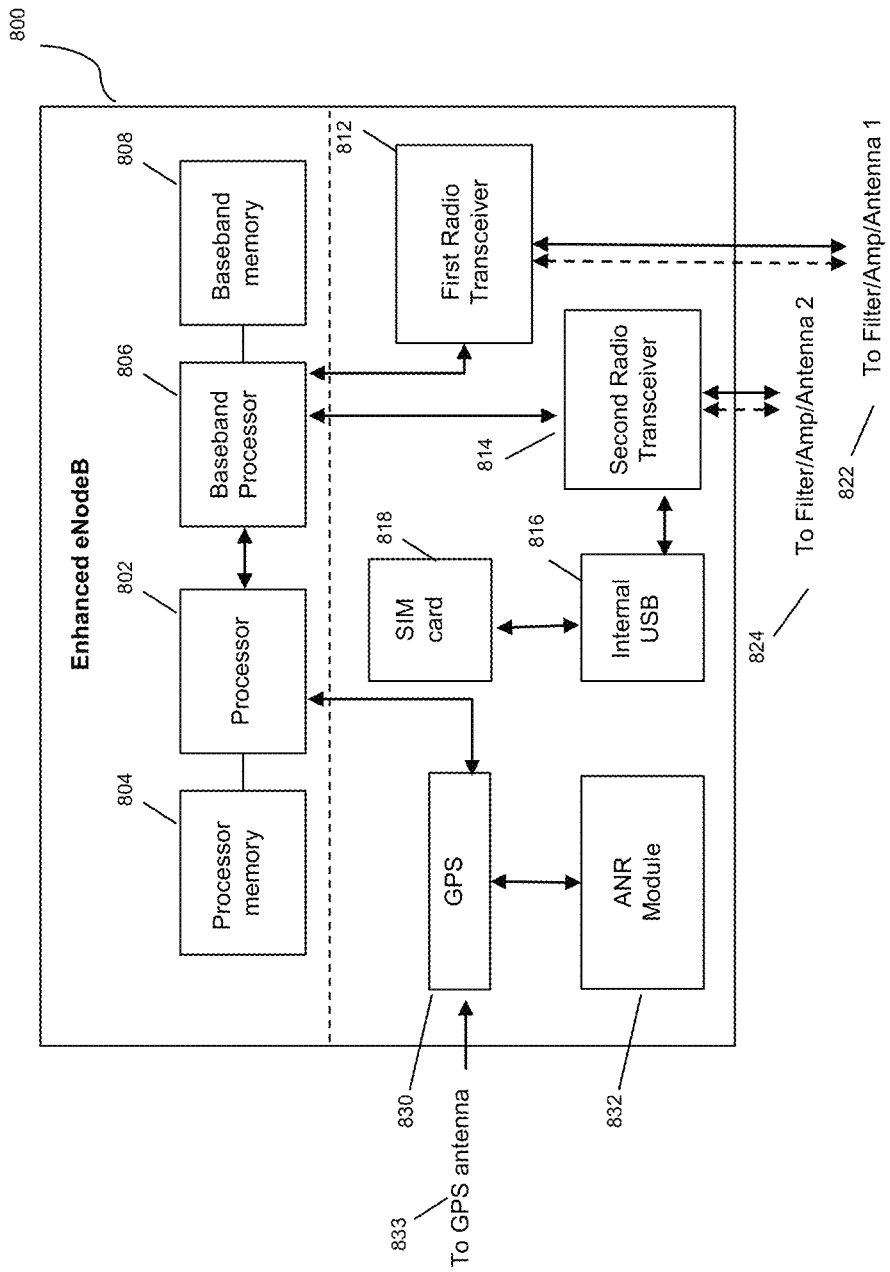
FIG. 8 is an enhanced eNodeB for performing the methods described herein, in accordance with some embodiments.

FIG. 8 is an enhanced base station for performing the methods described herein, in accordance with some embodiments. Base station 900 may include processor 802, processor memory 804 in communication with the processor, baseband processor 806, and baseband processor memory 808 in communication with the baseband processor. Mesh network node 800 may also include first radio transceiver 812 and second radio transceiver 814, internal universal serial bus (USB) port 816, and subscriber information module card (SIM card) 818 coupled to USB port 816. In some embodiments, the second radio transceiver 814 itself may be coupled to USB port 816, and communications from the baseband processor may be passed through USB port 816. The second radio transceiver may be used for wirelessly backhauling eNodeB 800.

Processor 802 and baseband processor 806 are in communication with one another. Processor 802 may perform routing functions, and may determine if/when a switch in network configuration is needed. Baseband processor 806 may generate and receive radio signals for both radio transceivers 812 and 814, based on instructions from processor 802. In some embodiments, processors 802 and 806 may be on the same physical logic board. In other embodiments, they may be on separate logic boards.

Processor 802 may identify the appropriate network configuration, and may perform routing of packets from one network interface to another accordingly. Processor 802 may use memory 804, in particular to store a routing table to be used for routing packets. Baseband processor 806 may perform operations to generate the radio frequency signals for transmission or retransmission by both transceivers 810 and 812. Baseband processor 806 may also perform operations to decode signals received by transceivers 812 and 814. Baseband processor 806 may use memory 808 to perform these tasks.

The first radio transceiver 812 may be a radio transceiver capable of providing LTE eNodeB functionality, and may be capable of higher power and multi-channel OFDMA. The second radio transceiver 814 may be a radio transceiver capable of providing LTE UE functionality. Both transceivers 812 and 814 may be capable of receiving and transmitting on one or more LTE bands. In some embodiments, either or both of transceivers 812 and 814 may be capable of providing both LTE eNodeB and LTE UE functionality. Transceiver 812 may be coupled to processor 802 via a Peripheral Component Interconnect-Express (PCI-E) bus, and/or via a daughtercard. As transceiver 814 is for providing LTE UE functionality, in effect emulating a user equipment, it may be connected via the same or different PCI-E bus, or by a USB bus, and may also be coupled to SIM card 818. First transceiver 812 may be coupled to first radio frequency (RF) chain (filter, amplifier, antenna) 822, and second transceiver 814 may be coupled to second RF chain (filter, amplifier, antenna) 824.

SIM card 818 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 800 is not an ordinary UE but instead is a special UE for providing backhaul to device 800.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 812 and 814, which may be 3G, 4G, 5G, Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 802 for reconfiguration.

A GPS module 830 may also be included, and may be in communication with a GPS antenna 832 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 832 may also be present and may run on processor 802 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 9:
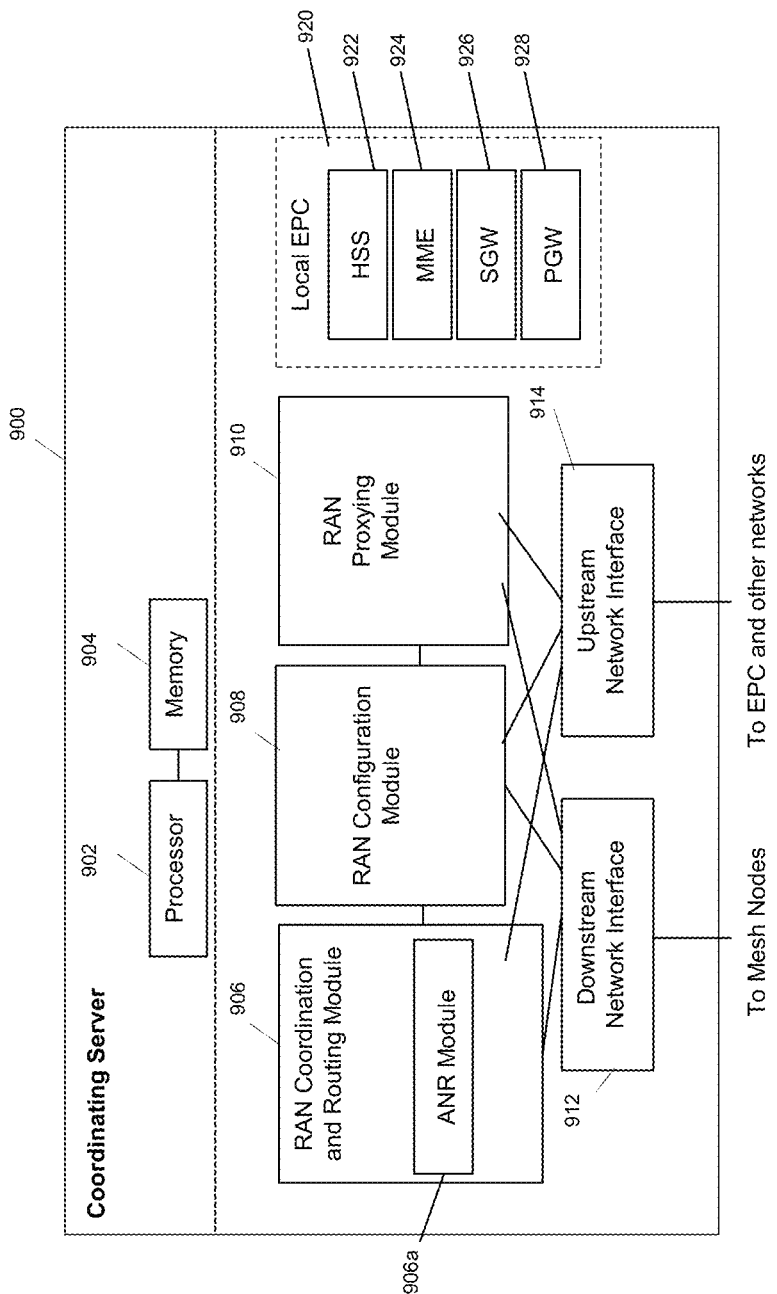
FIG. 9 is a coordinating server for providing services and performing methods as described herein, in accordance with some embodiments.

FIG. 9 is a coordinating server for providing services and performing methods as described herein, in accordance with some embodiments. Coordinating server 1000 includes processor 902 and memory 904, which are configured to provide the functions described herein. Also present are radio access network coordination/routing (RAN Coordination and routing) module 906, including ANR module 906*a*, RAN configuration module 908, and RAN proxying module 910. The ANR module 906*a* may perform the ANR tracking, PCI disambiguation, ECGI requesting, and GPS coalescing and tracking as described herein, in coordination with RAN coordination module 906 (e.g., for requesting ECGIs, etc.). In some embodiments, coordinating server 900 may coordinate multiple RANs using coordination module 906. In some embodiments, coordination server may also provide proxying, routing virtualization and RAN virtualization, via modules 910 and 908. In some embodiments, a downstream network interface 912 is provided for interfacing with the RANs, which may be a radio interface (e.g., LTE), and an upstream network interface 914 is provided for interfacing with the core network, which may be either a radio interface (e.g., LTE) or a wired interface (e.g., Ethernet).

Coordinator 900 includes local evolved packet core (EPC) module 920, for authenticating users, storing and caching priority profile information, and performing other EPC-dependent functions when no backhaul link is available. Local EPC 920 may include local HSS 922, local MME 924, local SGW 926, and local PGW 928, as well as other modules. Local EPC 920 may incorporate these modules as software modules, processes, or containers. Local EPC 920 may alternatively incorporate these modules as a small number of monolithic software processes. Modules 906, 908, 910 and local EPC 920 may each run on processor 902 or on another processor, or may be located within another device.

The protocols described herein have largely been adopted by the 3GPP as a standard for the upcoming 5G network technology as well, in particular for interfacing with 4G/LTE technology. For example, X2 is used in both 4G and 5G and is also complemented by 5G-specific standard protocols called Xn. Additionally, the 5G standard includes two phases, non-standalone (which will coexist with 4G devices and networks) and standalone, and also includes specifications for dual connectivity of UEs to both LTE and NR ("New Radio") 5G radio access networks. The inter-base station protocol between an LTE eNB and a 5G gNB is called Xx. The specifications of the Xn and Xx protocol are understood to be known to those of skill in the art and are hereby incorporated by reference dated as of the priority date of this application.

In some embodiments, several nodes in the 4G/LTE Evolved Packet Core (EPC), including mobility management entity (MME), MME/serving gateway (S-GW), and MME/S-GW are located in a core network. Where shown in the present disclosure it is understood that an MME/S-GW is representing any combination of nodes in a core network, of whatever generation technology, as appropriate. The present disclosure contemplates a gateway node, variously described as a gateway, HetNet Gateway, multi-RAT gateway, LTE Access Controller, radio access network controller, aggregating gateway, cloud coordination server, coordinating gateway, or coordination cloud, in a gateway role and position between one or more core networks (including multiple operator core networks and core networks of heterogeneous RATs) and the radio access network (RAN). This gateway node may also provide a gateway role for the X2 protocol or other protocols among a series of base stations. The gateway node may also be a security gateway, for example, a TWAG or ePDG. The RAN shown is for use at least with an evolved universal mobile telecommunications system terrestrial radio access network (E-UTRAN) for 4G/LTE, and for 5G, and with any other combination of RATs, and is shown with multiple included base stations, which may be eNBs or may include regular eNBs, femto cells, small cells, virtual cells, virtualized cells (i.e., real cells behind a virtualization gateway), or other cellular base stations, including 3G base stations and 5G base stations (gNBs), or base stations that provide multi-RAT access in a single device, depending on context.

In the present disclosure, the words "eNB," "eNodeB," and "gNodeB" are used to refer to a cellular base station. However, one of skill in the art would appreciate that it would be possible to provide the same functionality and services to other types of base stations, as well as any equivalents, such as Home eNodeBs. In some cases Wi-Fi may be provided as a RAT, either on its own or as a component of a cellular access network via a trusted wireless access gateway (TWAG), evolved packet data network gateway (ePDG) or other gateway, which may be the same as the coordinating gateway described hereinabove.

The word "X2" herein may be understood to include X2 or also Xn or Xx, as appropriate. The gateway described herein is understood to be able to be used as a proxy, gateway, B2BUA, interworking node, interoperability node, etc. as described herein for and between X2, Xn, and/or Xx, as appropriate, as well as for any other protocol and/or any other communications between an LTE eNB, a 5G gNB (either NR, standalone or non-standalone). The gateway described herein is understood to be suitable for providing a stateful proxy that models capabilities of dual connectivity-capable handsets for when such handsets are connected to any combination of eNBs and gNBs. The gateway described herein may perform stateful interworking for master cell group (MCG), secondary cell group (SCG), other dual-connectivity scenarios, or single-connectivity scenarios.

In some embodiments, the base stations described herein may be compatible with a Long Term Evolution (LTE) radio transmission protocol, or another air interface. The LTE-compatible base stations may be eNodeBs, or may be gNodeBs, or may be hybrid base stations supporting multiple technologies and may have integration across multiple cellular network generations such as steering, memory sharing, data structure sharing, shared connections to core network nodes, etc. In addition to supporting the LTE protocol, the base stations may also support other air interfaces, such as UMTS/HSPA, CDMA/CDMA2000, GSM/EDGE, GPRS, EVDO, other 3G/2G, legacy TDD, 5G, or other air interfaces used for mobile telephony. In some embodiments, the base stations described herein may support Wi-Fi air interfaces, which may include one of 802.11a/b/g/n/ac/ad/af/ah. In some embodiments, the base stations described herein may support 802.16 (WiMAX), or other air interfaces. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method for performing Over-The-Air (OTA) testing for 5G New Radio (NR) beamforming, comprising:
transmitting, by only a User Equipment (UE) under test U and a supporting UE Sx, Orthogonal Frequency Division Multiplexing (OFDM) symbols containing UL Demodulation Reference Signals (DMRS) that are orthogonal to each other during a particular Uplink (UL) subframe;
computing, by a gNB, in the same UL subframe as the UL subframe of the transmitted DMRS signals, a channel estimation matrix, a precoding matrix, and MU-MIMO antenna element weighting coefficients;
transmitting, by the gNB in a subsequent Downlink (DL) subframe, known data streams to the UE under test U and the supporting UE $S_x$ using the computed MU-MIMO antenna element weighting coefficients;
collecting, by a host PC, IQ samples from the UE under test U and a plurality of victim UEs $V_x$ in the subsequent DL subframe; and
evaluating performance of the transmitted known data stream received at the UE under test U.

2. The method of claim 1 wherein the evaluating a performance of the transmitted known data stream received at the UE under test U comprises using a value of an Error Vector Magnitude (EVM) of demodulated Quadrature Amplitude Modulation (QAM) symbols from the UEs U and Vx.

3. The method of claim 2 further comprising calibrating a value of EVM using a thermal noise variance $\sigma^2$ from U and Vx.

4. The method of claim 1, further comprising: a plurality of User Equipments (UEs), wherein a first UE (U) is used for assessing the performance of a transmitted test data stream directed towards it, wherein at least one second UE (Vx) is a victim UE and wherein at least one using a third UE (Sx) to increase the dimension of a matrix H for a given test.

5. The method of claim 4 wherein the victim UEs are used to evaluate the deviation of an intended beam from U.

6. The method of claim 5 wherein the victim UEs are placed at horizontal angles of $\theta_x$ relative to U.

7. The method of claim 5 wherein the victim UEs are placed at vertical angles $\varphi_x$ relative to U.

8. The method of claim 5 wherein the system evaluates a performance of the beam that was meant for UE U using a value of an Error Vector Magnitude (EVM) of demodulated Quadrature Amplitude Modulation (QAM) symbols from the UEs U and Vx.

9. The method of claim 8 wherein a value of EVM is calibrated using a thermal noise variance $\sigma^2$ from U and Vx.

10. The method of claim 4 wherein the DUT includes a digital baseband section and an analog RF section.

11. The method of claim 4 wherein the host computer schedule Uplink transmissions from each of the UEs.

12. The method of claim 11 wherein the host computer collects the IQ samples from a plurality of UE simulators to do performance analysis.

13. The method of claim 4 wherein a gNB and a plurality of UE simulators are synchronized using a master clock.

* * * * *